United States Patent
Kanzler

(10) Patent No.: US 10,933,345 B2
(45) Date of Patent: Mar. 2, 2021

(54) APPARATUS AND METHOD INSTALLING A PACKING DISK OF A STRUCTURED PACKING INTO A VESSEL OF A MATERIAL-EXCHANGE COLUMN

(71) Applicant: LINDE AKTIENGESELLSCHAFT, Munich (DE)

(72) Inventor: Karlmann Kanzler, Altotting (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 320 days.

(21) Appl. No.: 16/083,781

(22) PCT Filed: Mar. 9, 2017

(86) PCT No.: PCT/EP2017/025046
§ 371 (c)(1),
(2) Date: Sep. 10, 2018

(87) PCT Pub. No.: WO2017/153057
PCT Pub. Date: Sep. 14, 2017

(65) Prior Publication Data
US 2019/0083899 A1    Mar. 21, 2019

(30) Foreign Application Priority Data

Mar. 10, 2016    (EP) .................................... 16000583

(51) Int. Cl.
*B01D 3/32* (2006.01)
*B01J 19/32* (2006.01)

(52) U.S. Cl.
CPC .............. *B01D 3/328* (2013.01); *B01D 3/32* (2013.01); *B01J 19/32* (2013.01); *B01J 19/325* (2013.01)

(58) Field of Classification Search
CPC .. B01D 3/32; B01D 3/328; B01J 19/32; B01J 19/325; B65B 35/00; B65B 35/50
(Continued)

(56) References Cited

U.S. PATENT DOCUMENTS 9,187,194 B2    11/2015 Granger et al.
9,302,798 B2    4/2016 Granger et al.
(Continued)

FOREIGN PATENT DOCUMENTS

DE    19520802 A1    12/1996

OTHER PUBLICATIONS

International Search Report for PCT/EP2017/025046 dated May 29, 2017.
(Continued)

*Primary Examiner* — Charles S Bushey
(74) *Attorney, Agent, or Firm* — Millen White Zelano & Branigan, PC; Brion P. Heaney

(57) ABSTRACT

An apparatus is provided for installing a packing disk of a structured packing into a vessel of a material-exchange column. The apparatus has a separating device for separating the endless packing strip into individual packing sheets, a conveying device for conveying individual packing sheets to the vessel, to stack the individual packing sheets in the vessel to form the packing disk, and a measuring device designed to measure a preferably horizontal distance between two mutually opposite points of an internal contour of the vessel. The separating device is designed to separate individual packing sheets from the endless packing strip such that a respective length of the packing sheets is less than or equal to the measured distance. A central axis of the vessel is arranged horizontally in the apparatus.

20 Claims, 13 Drawing Sheets

(58) Field of Classification Search
USPC ...... 261/108, 113, DIG. 72; 29/426.2, 426.3, 29/428, 429, 445
See application file for complete search history.

(56) References Cited

U.S. PATENT DOCUMENTS

| | | | |
|---|---|---|---|
| 9,399,530 B2 | 7/2016 | Granger et al. | |
| 9,550,592 B2 | 1/2017 | Granger et al. | |
| 9,550,593 B2 | 1/2017 | Granger et al. | |
| 9,637,257 B2 | 5/2017 | Granger et al. | |
| 9,663,256 B2 | 5/2017 | Granger et al. | |
| 9,663,257 B2 | 5/2017 | Granger et al. | |
| 9,745,092 B2 | 8/2017 | Granger et al. | |
| 9,815,578 B2 | 11/2017 | Granger et al. | |
| 2011/0229689 A1* | 9/2011 | Giang | B21D 53/02 428/141 |
| 2014/0345102 A1 | 11/2014 | Granger et al. | |
| 2014/0345106 A1 | 11/2014 | Granger et al. | |
| 2014/0345114 A1 | 11/2014 | Granger et al. | |
| 2014/0345115 A1 | 11/2014 | Granger et al. | |
| 2014/0345140 A1 | 11/2014 | Granger et al. | |
| 2014/0345206 A1 | 11/2014 | Granger et al. | |
| 2014/0345352 A1 | 11/2014 | Granger et al. | |
| 2014/0345490 A1 | 11/2014 | Granger et al. | |
| 2014/0345504 A1 | 11/2014 | Granger et al. | |
| 2014/0345973 A1 | 11/2014 | Granger et al. | |
| 2014/0345975 A1 | 11/2014 | Granger et al. | |
| 2014/0346792 A1 | 11/2014 | Granger et al. | |
| 2014/0348619 A1 | 11/2014 | Granger et al. | |
| 2016/0250616 A1* | 9/2016 | Minami | B01F 3/04078 261/112.2 |
| 2019/0210000 A1* | 7/2019 | Headley | B01D 3/008 |

OTHER PUBLICATIONS

English Abstract for DE19520802, Publication Date: Dec. 12, 1996.

* cited by examiner

APPARATUS AND METHOD INSTALLING A PACKING DISK OF A STRUCTURED PACKING INTO A VESSEL OF A MATERIAL-EXCHANGE COLUMN

The present invention relates to an apparatus for installing a packing plate of a structured packing into a vessel of a mass transfer column and to a corresponding method.

With the aid of mass transfer columns, such as rectification or air separation columns, it is possible to break down liquefied air into its constituents. Such a mass transfer column has a cylindrical vessel, in which so-called packings are arranged. A distinction is made here between random and structured packings. Random packings are loose fills of bodies of a defined shape, such as rings, cylinders, saddles or the like. By contrast with this, in the case of structured packings metal meshes or sheets are folded and/or wound in such a way that there is intensive directing of the vapor and the liquid, and an associated intensive contact of the two. In the case of structured packings, a number of packing plates are stacked one on top of the other. To make fitting in the vessel easier, the packing plates may be divided into packing packets in the form of blocks. The packing packets are in turn respectively constructed from a multiplicity of packing sheets stacked one on top of the other.

DE 43 06 235 B4 describes a packing portion for a heat exchange and mass transfer column with a cylindrical packing comprising vertically arranged metal sheets provided with crossing grooving, wherein the packing has a diameter greater than 2 m and is surrounded by a tensioning peripheral hoop, with an axial length greater than half the axial length of the packing, wherein the hoop encircles the packing under a tensioning force greater than 1000 daN, in order to provide a solid and self-supporting unified packing assembly.

DE 195 20 802 C2 gives a description of a mass transfer column that has a number of layers of a structured packing. With greater column diameters, segmented packing layers are preferred, which as shown in FIGS. 1 and 2 may for example have six segments.

US 2014/0345102 A1 describes the installation of a packing into a distillation column. As described with reference to FIG. 13 in paragraph [0316], the packing production area comprises a coil holder 92, which continuously feeds metal strips into a press 94 for producing a corrugated packing. From there, the corrugated packings are brought to a washing and cutting unit 96, in order to clean them and cut them into corresponding packing strips. After cutting, the individual packing strips are brought to a reception table 98, where the strips are organized and grouped together before using the transfer table 100 to transfer the grouped strips to the working table 102, where they are then put together to form a complete packing. As further stated in paragraph [0317], a packing strip 109 is placed circumferentially around the packing in order to form a complete packing unit. With the aid of a packing lifting device 12, the packing unit, which has a cylindrical form, is placed onto the packing pallet 114, which is transported to another building B2 with the aid of a trailer 116 for installation of the packing unit into the column. As can be seen from FIGS. 22 to 23 and as described in paragraph [0347], the packing units are subsequently lifted into the column portions 138 from above. Alternatively, as described in paragraph [0348], packing parts delivered in boxes are lifted into the column portions 138 from above and manually installed by a worker.

The object of the present invention is to provide an improved method and an improved apparatus for installing a packing into a vessel of a mass transfer column.

Accordingly, an apparatus for installing a packing plate of a structured packing into a vessel of a mass transfer column is proposed. The apparatus comprises a separating device for separating an endless packing strip into individual packing sheets, a feeding device for feeding the individual packing sheets to the vessel, in order to stack the individual packing sheets in the vessel to form the packing plate, and a measuring device, which is designed to measure a distance, preferably a horizontal distance, between two points opposite one another of an internal contour of the vessel, wherein the separating device is designed to detach the individual packing sheets from the endless packing strip in such a way that a respective length of the packing sheets is less than or equal to the measured horizontal distance. Here, a central axis of the vessel is arranged, in other words mounted or held, horizontally in the apparatus.

An advantage of the horizontal arrangement of the central axis of the vessel is that the introduction of the packing sheets can be performed easily, via one of the laterally located openings in the column. Moreover, the horizontal alignment of the vessel allows the individual packing sheets to be stacked one on top of the other, without the packing sheets that have already been placed in having to be held during installation.

This is so because the installation of the packing sheets is generally performed in such a way that they are arranged lying in a plane parallel to the central axis of the vessel. Moreover, the feeding device for the packing sheets can be of a simple design, since no great differences in height between the separating device and the vessel opening via which the installation is performed have to be overcome.

Within the scope of the present invention, a "horizontal arrangement" of the central axis should be understood as meaning an arrangement in which the central axis of the vessel has in relation to the horizontal an inclination of no more than 15° (angular degrees), particularly preferably however of no more than 10°, more particularly preferably of no more than 5°. An inclination in relation to the horizontal as described above may even be of advantage for the installation of the packing sheets if the vessel slopes down slightly, seen from the installation opening to its other end. In this way, packing sheets can be prevented from slipping out of the vessel through the installation opening.

Preferably, the apparatus according to the invention has a production device for producing the endless packing strip.

An endless packing strip should be understood as meaning a strip of sheet metal of a length greater than a diameter of the vessel, preferably many times greater, for example 20 times. The fact that the packing sheets are individually fed to the vessel and stacked there to form the packing plate means that there is no need for the packing plate to be separated into individual packing packets. This allows the packing plate to be fitted much more easily, and joints between individual packing packets can be eliminated. That the length of the packing sheets is less than the measured horizontal distance should be understood as meaning that the packing sheets are of such a length that they can be placed into the vessel with play.

The internal contour of the vessel preferably has a circular geometry. Alternatively, the internal contour may also have a contour other than a circular geometry, for example an oval contour. The internal contour of the vessel is preferably defined by the vessel shell. The internal contour of the vessel may also be defined within the scope of the present invention by a sealing means, in particular a sealing collar, which is arranged between the packing plate and the vessel shell.

Preferably, the apparatus comprises a foundation, wherein a central axis of the vessel is arranged parallel to the foundation. Here, however, deviations of no more than 15° (angular degrees), preferably of no more than 10°, particularly preferably of no more than 5°, from an exactly parallel arrangement are possible.

The foundation may be for example a factory floor. The apparatus may be transportable, so that it can be transported to an installation site of the mass transfer column, in order to fill the vessel there with structured packings.

According to one embodiment, the feeding device has a height-adjustable conveyor belt.

According to a further embodiment, the feeding device has an articulated roller conveyor belt and a lifting unit, which is designed to raise and lower the roller conveyor belt.

The lifting unit may be for example a scissors-type lifting table.

According to a further embodiment, the roller conveyor belt comprises a packing-sheet erecting unit for bringing the individual packing sheets from a horizontal arrangement into a vertical arrangement.

The roller conveyor belt preferably comprises a multiplicity of roller blocks. In particular, the packing-sheet erecting unit also comprises a multiplicity of roller blocks, wherein a first roller block and a last roller block of the packing-sheet erecting unit are arranged perpendicularly to one another. The packing sheet is turned by an angle of 90° in the packing-sheet erecting unit.

According to a further embodiment, the separating device has a measuring unit for measuring the individual packing sheets.

With the aid of the measuring unit, the length of the individual packing sheets is measured in dependence on the distance determined by the measuring device, and the individual packing sheets are detached from the endless packing strip with the aid of the separating device.

According to a further embodiment, the apparatus also comprises a height-adjustable working platform that can be arranged in the vessel.

This allows a fitter who is fitting the packing sheet to handle the apparatus comfortably. Preferably, the working platform is fastened horizontally movably on a carrier, which is mounted displaceably on the lifting unit of the feeding device. Preferably, the working platform has telescopic platform portions.

Telescopic means here retractable and extendable. This allows the working platform to be moved in the vertical direction in the vessel.

According to a further embodiment, the apparatus also comprises an aligning angle for aligning the individual packing sheets in relation to one another in the vessel, wherein the measuring device is preferably provided on the aligning angle.

Preferably, the aligning angle comprises a first surface and a second surface, arranged perpendicularly to the first surface. With the aid of the aligning angle, the individual packing sheets can be aligned in relation to one another and smoothed when they are being stacked to form the packing plate.

Also proposed is a method for installing a packing plate of a structured packing into a vessel of a mass transfer column, wherein a central axis of the vessel is arranged horizontally.

The method has the following steps:
providing an endless packing strip;
determining a distance, in particular a horizontal distance, between two points opposite one another of an internal contour of the vessel;
detaching individual packing sheets from the endless packing strip, wherein the individual packing sheets are detached from the endless packing strip in such a way that a length of a respective packing sheet corresponds to the distance or is less than the distance;
feeding the individual packing sheets to the vessel;
placing, preferably stacking, the individual packing sheets into the vessel;
wherein the steps are carried out repeatedly to form the packing sheet.

Preferably, the packing sheets are placed next to one another or one on top of the other in a stack.

Preferably, the individual packing sheets are fed to the vessel one after the other. The preferably horizontal distance between the two points opposite one another of the internal contour of the vessel is measured with the aid of a measuring device, preferably the measuring device described above. In particular, with the aid of the measuring device, the length of a packing sheet that is not placed directly onto an already lying packing sheet, but onto for example a third subsequent packing sheet, can be determined.

According to one embodiment, the preferably horizontal distance is determined separately for each individual packing sheet.

The preferably horizontal distance may be for example a chord of the circular internal contour of the vessel.

As already stated above, the central axis of the vessel is arranged horizontally. In comparison with known arrangements, in which the central axis is arranged vertically, this produces a small overall height of the apparatus, whereby the feeding of the packing sheets and the installation of the packing sheets into the column is made considerably easier.

According to a further embodiment, a number of individual, i.e. unconnected, i.e. loose, packing sheets are fed to the vessel at the same time. This should be understood as meaning that a number of packing sheets that are fed to the vessel one after the other are held at the same time in the feeding device. There is however also the possibility of feeding the packing sheets to the vessel individually.

According to a further embodiment, the preferably horizontal distance is measured a predetermined distance away from a packing sheet that has already been placed in, preferably with one side exposed, particularly preferably from an uppermost packing sheet.

Preferably, the measuring device comprises a laser measuring unit. With the aid of the laser measuring unit, the preferably horizontal distance can be determined.

According to a further embodiment, after the installation of one packing plate and before the installation of a further packing plate, the vessel is turned.

In this way, the groovings or corrugations of packing sheets of neighboring packing plates can be oriented differently.

Further possible implementations of the apparatus and/or of the method also include combinations of features and embodiments described above or below with respect to the exemplary embodiments that have not been explicitly mentioned. A person skilled in the art will also add individual aspects as improvements or supplementations to the respective basic form of the apparatus and/or of the method.

BRIEF DESCRIPTION OF THE FIGURES

Further advantageous design embodiments and aspects of the apparatus and/or of the method are the subject matter of the dependent claims and of the exemplary embodiments of the apparatus and/or of the method described below. The apparatus and/or the method will be explained in more detail hereunder on the basis of preferred embodiments with reference to the appended figures.

In the figures, elements that are the same or have the same function have been given the same reference signs, unless stated otherwise.

Figure 1:
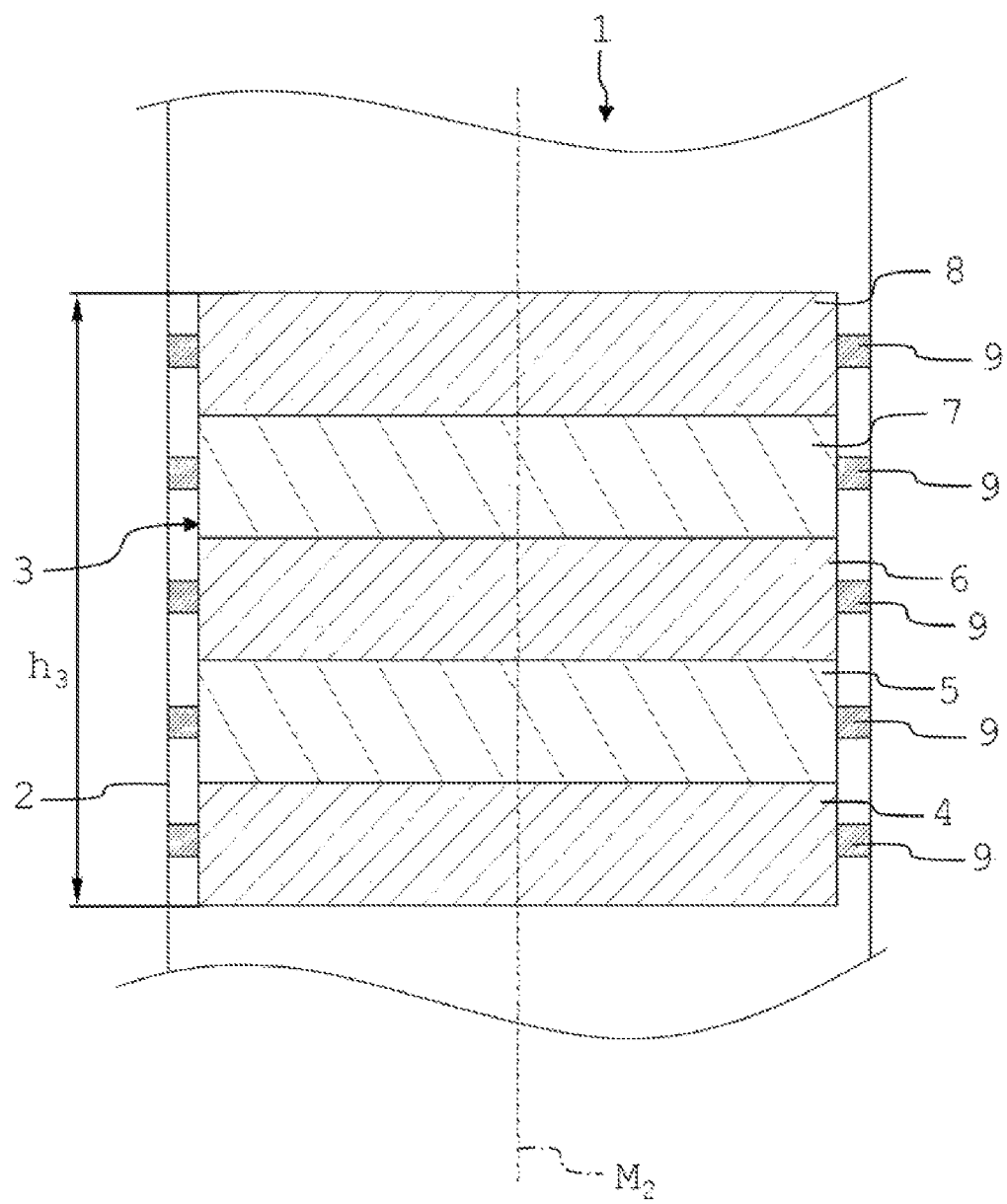
FIG. 1 shows a schematic sectional view of one embodiment of a mass transfer column.

FIG. 1 shows a greatly simplified schematic sectional view of one embodiment of a mass transfer column 1. The mass transfer column 1 may be a rectification or air separation column. Rectification should be understood as meaning a thermal separating process which represents an extension of distillation or an arrangement of many distillation steps in series. As compared with distillation, the advantages of rectification are that the plant can be operated continuously and that the separating effect is many times greater in comparison with distillation, since the vapor comes into contact with the liquid in counter current repeatedly in succession. The mass transfer column 1 consequently operates more efficiently in terms of energy, is technically less complex and more space-saving than an arrangement of single distillations one after the other.

The mass transfer column 1 comprises a vessel 2, which has a cylindrical geometry. The vessel 2 may for example be produced from an aluminum material or a steel material. The vessel 2 is preferably produced from an aluminum material. The vessel 2 is constructed cylindrically around an axis of symmetry or central axis $M_2$. The vessel 2 may for example have a height of 30 000 to 50 000 millimeters. The vessel 2 may have a circular or approximately circular, for example oval, cross section. The vessel 2 is preferably constructed from a multiplicity of vessel portions or shell portions that are connected to one another in a material-bonding manner. The vessel portions may also be referred to as vessel sections or shell sections. In the orientation of FIG. 1, the central axis $M_2$ is arranged vertically, that is to say in the direction of gravitational force.

A multiplicity of packings 3 stacked one on top of the other are arranged in the vessel 2, only one of which however is shown in FIG. 1. The packing 3 is a so-called structured packing. By contrast with structured packings, in the case of such packings 3, metal meshes or sheets are folded and/or wound in such a way that there is intensive directing of the vapor and the liquid, and an associated intensive contact of the two. By further structuring of the surface and by making holes, both the wettability of the packing surface and the mass transfer are increased further.

The packing 3 may have a multiplicity of structured packing plates 4 to 8, which are arranged one on top of the other. The packing plates 4 to 8 may also be referred to as packing layers. Such packing plates 4 to 8 consist of thin, corrugated and/or perforated metal plates, or wire meshes. The design of the packing plates 4 to 8 ensures an optimum exchange between the various phases (liquid/gaseous or liquid/liquid) with minimal pressure resistance. There can be any number of packing plates 4 to 8 per packing 3.

The packing plates 4 to 8 may be produced from perpendicularly arranged packing sheets, in particular from corrugated aluminum sheets. Because of their structure, the packing plates 4 to 8 form condensation surfaces, on which for example during air separation constituents of air can condense. For example, the packing sheets used may have a thickness of 0.1 millimeter. The packing plates 4 to 8 are not segmented. That is to say that the packing plates 4 to 8 are not divided into individual packing packets. Each packing plate 4 to 8 may for example have a thickness of 200 to 500 millimeters. The packing 3 may thus have a height $h_3$ of for example 1000 to 7000 millimeters. A peripheral packing collar or sealing collar 9 may also be provided between the vessel 2 and the packing 3 or between the vessel 2 and each packing plate 4 to 8. The sealing collar 9 is optional, and consequently can be omitted.

Figure 2:
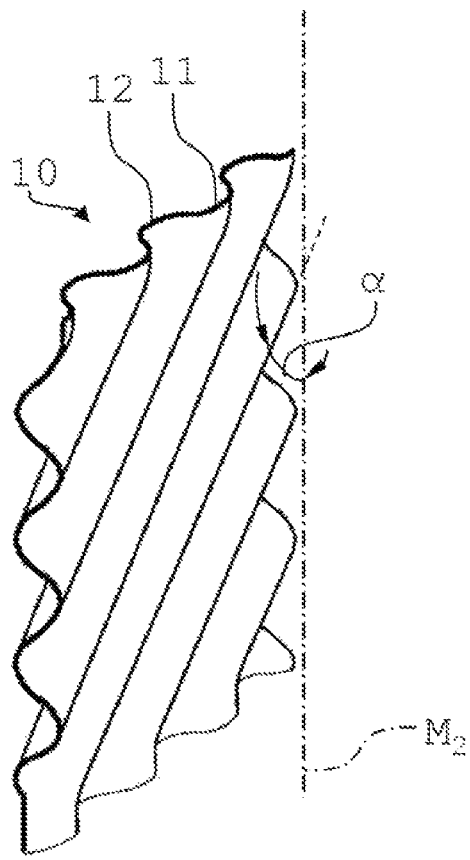
FIG. 2 shows a schematic perspective view of a packing sheet for a packing of the mass transfer column according to FIG. 1.

FIG. 2 shows a schematic perspective view of part of an embodiment of a packing sheet 10, from a multiplicity of which the packing plates 4 to 8 are respectively constructed. As FIG. 2 shows, the packing sheet 10 has a corrugated form with corrugation peaks 11 and corrugation valleys 12. In addition, the packing sheet 10 may have groovings, perforations, bores and/or apertures. The packing sheet 10 may also be in the form of a mesh or grid. The packing sheet 10 is preferably formed from an aluminum material and, as already mentioned above, may have a thickness of 0.1 millimeter. For producing a packing plate 4 to 8, a multiplicity of such packing sheets 10 are stacked one on top of the other. As FIG. 2 also reveals, the corrugation peaks 11 and the corrugation valleys 12 run at an angle α to the central axis $M_2$. The angle α is for example 45°. Neighboring packing sheets 10 may be arranged in such a way that the corrugation peaks 11 and the corrugation valleys 12 cross over. It can also be seen from FIG. 2 that the packing sheets 10 are arranged in such a way that they lie in a plane parallel to the central axis $M_2$ of the vessel 2.

Figure 3:
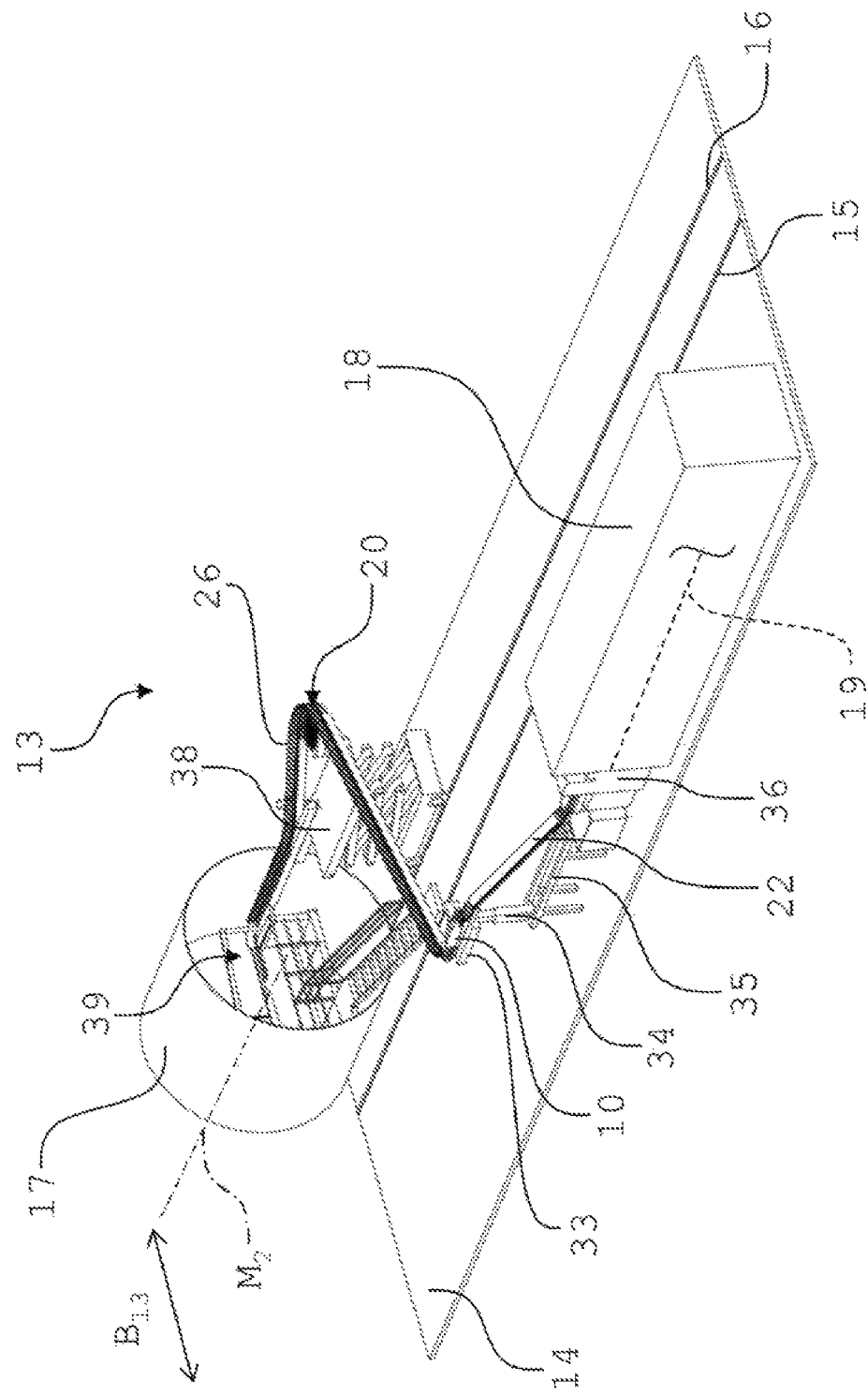
FIG. 3 shows a schematic perspective view of an apparatus for installing a packing plate into a vessel for the mass transfer column according to FIG. 1.
Figure 4:
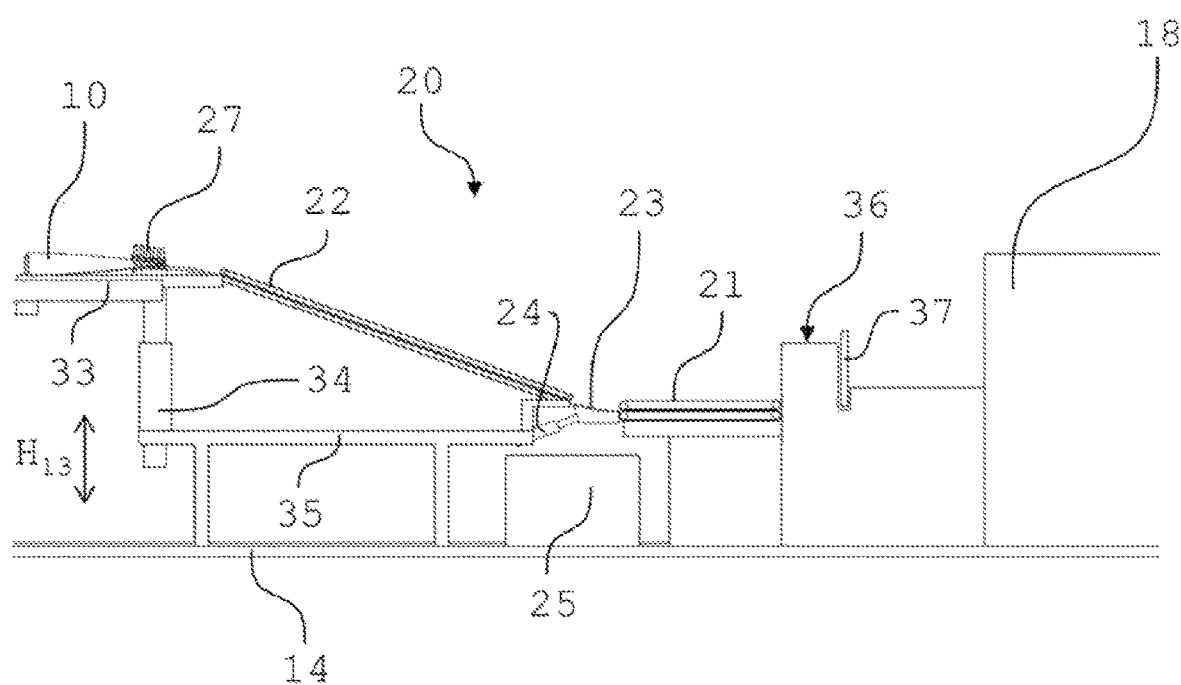
FIG. 4 shows a schematic partial view of the apparatus according to FIG. 3.

FIG. 3 shows a schematic perspective view and FIG. 4 shows a schematic partial view of one embodiment of an apparatus 13 for installing the packing plates 4 to 8 into the vessel 2. The apparatus 13 comprises a foundation 14. The foundation 14 may be for example a factory floor. Guiding devices 15, 16, for example rails, may be provided on the foundation 14. Turning devices, which carry a vessel portion 17 of the vessel 2 shown in FIG. 1, may be displaceably guided on the guiding devices 15, 16. A number of such vessel portions 17 are combined to form a vessel 2. Alternatively, the apparatus 13 may also hold a completely finished vessel 2. The central axis $M_2$ is arranged horizontally, that is to say parallel to the foundation 14. The horizontal arrangement should be understood as meaning that a deviation from the horizontal of up to 15°, preferably of up to 10° and more preferably of up to 5°, is included. The same applies to a parallel arrangement in relation to the foundation: here, too, deviations of up to 15°, preferably up to 10° and particularly preferably of up to 5°, are included. The vessel portion 17 may have a circular or approximately circular cross section. The cross section may for example also be oval or slightly oval. With the aid of the turning devices (not shown) that carry the vessel portion 17, the vessel portion 17 can be turned about the central axis $M_2$ The apparatus 13 comprises a production device 18 for producing an endless packing strip 19. The endless packing strip 19 may be divided into a multiplicity of packing sheets 10 for forming a packing plate 4 to 8. That the packing strip 19 is endless should be understood as meaning that a length of the packing strip 19 is much greater than a diameter of the vessel portion 17, so that a multiplicity of packing sheets 10 can be produced from the endless packing strip 19. With the aid of the production device 18, for example a so-called coil of aluminum sheet can be grooved, corrugated and/or provided with perforations, in order to produce the endless packing strip 19.

The apparatus 13 also comprises a feeding device 20 for feeding the individual packing sheets 10 to the vessel portion 17. The feeding device 20 comprises an intermediate conveyor belt 21, arranged downstream of the production device 18, and a conveyor belt 22, arranged downstream of the intermediate conveyor belt 21. The intermediate conveyor belt 21 and the conveyor belt 22 may be configured as double belts, in order to ensure reliable conveyance of the packing sheets 10. The packing sheets 10 are transported in a lying position on the intermediate conveyor belt 21 and the conveyor belt 22. Provided between the intermediate conveyor belt 21 and the conveyor belt 22 is a diverter 23 with a drive 24. The drive 24 may be for example a pneumatic cylinder or a hydraulic cylinder. The drive 24 moves the diverter 23 in such a way that between the intermediate conveyor belt 21 and the conveyor belt 22 there can be an opening via which packing sheets 10 that are not of the correct size can be rejected. For example, a packing sheet 10 that is too narrow then falls out of the intermediate conveyor belt 21 into a waste bin or container 25. With the aid of the conveyor belt 22, a difference in height between the production device 18 and the installation site of the respective packing sheet 10 can be overcome. Here, the flexibility of the lying packing sheet 10 can be utilized.

The feeding device 20 also comprises a roller conveyor belt 26, with which the packing sheets 10 are transported in an upright rather than lying position. Provided between the conveyor belt 22 and the roller conveyor belt 26 is a packing-sheet erecting unit 27. The packing-sheet erecting unit 27 is shown in detail in FIG. 5. The packing-sheet erecting unit 27 comprises a multiplicity of roller blocks 28. As shown in FIG. 6, each roller block 28 comprises a lower roller 29 and two side rollers 30, 31. A narrow side of the respective packing sheet 10 lies on the lower roller 29. The lower roller 29 is driven by a drive element 32, in particular an electric motor. Alternatively, the lower roller 29 may also be driven by a belt drive.

Figure 5:
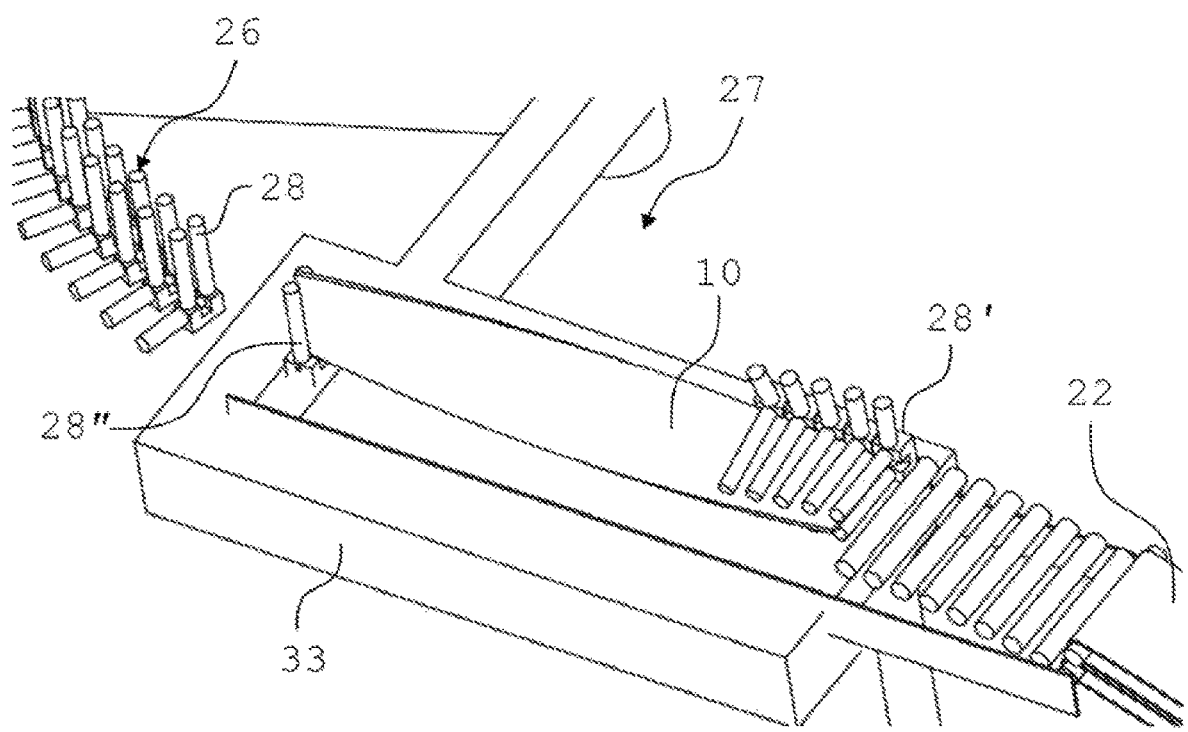
FIG. 5 shows a schematic perspective partial view of the apparatus according to FIG. 3.
Figure 6:
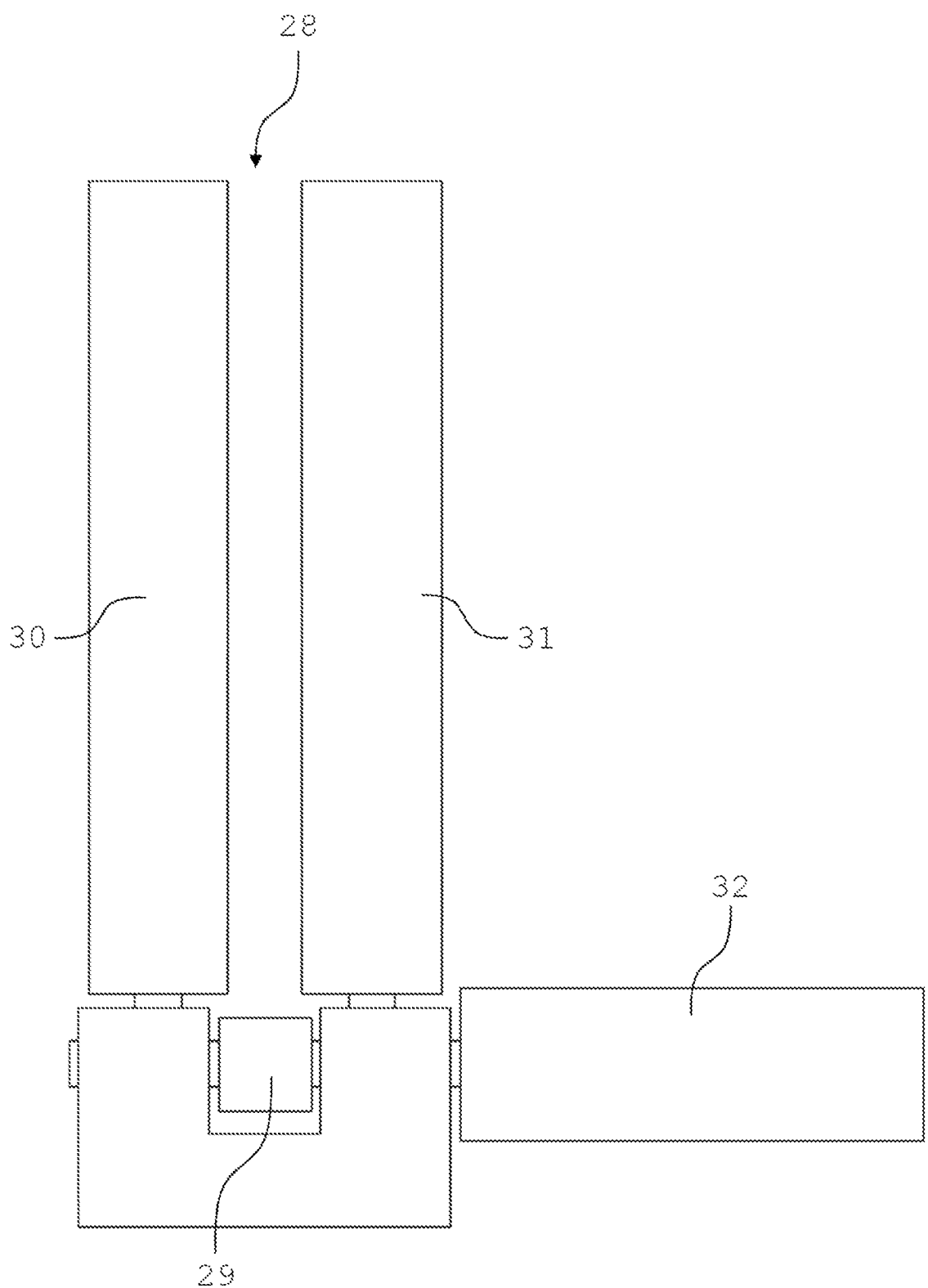
FIG. 6 shows a schematic side view of a roller block for the apparatus according to FIG. 3.

As shown in FIG. 5, the side rollers 30, 31 of a first roller block 28' of the packing-sheet erecting unit 27 are turned by 90° in relation to a last roller block 28" of the packing-sheet erecting unit 27. This allows the packing sheet 10 to be brought smoothly from a lying position into an upright position. The transported packing sheet 10 is thereby twisted. The roller conveyor belt 26 likewise comprises a multiplicity of roller blocks 28, between the side rollers 30, 31 of which the packing sheet 10 placed on edge is fed to the vessel portion 17. As shown in FIG. 5, a multiplicity of roller blocks 28, which are arranged along the twisted packing sheet 10, may be provided between the first roller block 28' of the packing-sheet erecting unit 27 and the last roller block 28" of the same. For the sake of simplicity, only some of this multiplicity of roller blocks 28 are shown in FIG. 5.

The packing-sheet erecting unit 27 is mounted on a base plate 33. The base plate 33 is connected to a carrying framework 35 by means of a lifting element 34, for example a pneumatic or hydraulic cylinder. The carrying framework 35 is arranged on the foundation 14 and may be fixedly connected to it. The conveyor belt 22 is arranged between the packing-sheet erecting unit 27 and the diverter 23. In particular, the conveyor belt 22 is connected to the base plate 33 and the carrying framework 35. The inclination of the conveyor belt 22 can be changed by a height adjustment of the lifting element 34. A difference in height between the production device 18 and the vessel portion 17 can be overcome with the aid of the conveyor belt 22, wherein the flexibility of the lying packing sheet 10 is utilized. Since the packing sheet 10 is transported while upright in the roller conveyor belt 26, a height correction is not possible at the roller conveyor belt 26. With the aid of the lifting element 34, the apparatus 13 can be set in height direction $H_{13}$. With the aid of the roller conveyor belt 26, the apparatus 13 can be set in a width direction $B_{13}$, since the roller conveyor belt 26 is articulated in the width direction $B_{13}$.

The apparatus 13 also comprises a separating device 36, which is arranged between the intermediate conveyor belt 21 and the production device 18. With the aid of the separating device 36, the endless packing strip 19 can be separated into individual packing sheets 10. The separating device 36 also comprises a measuring unit 37 for checking or measuring a length of the packing sheet 10 to be cut to size before it is detached from the endless packing strip 19. The intermediate conveyor belt 21, the diverter 23 and the drive 24 may be assigned to the separating device 36.

When packing sheets 10 are being detached, the endless packing strip 19 is measured with the aid of the measuring unit 37. If the cut-off packing sheet 10 is not within the desired tolerance, just a short portion of the packing sheet 10, for example with a length of 100 millimeters, is cut off by the separating device 36. For this purpose, the drive 24 moves the diverter 23 in such a way that between the intermediate conveyor belt 21 and the conveyor belt 22 there is an opening through which the portion of the packing sheet 10 falls into the container 25. These steps are carried out until the packing sheet 10 is within the desired tolerance again.

Departing from the representation in FIG. 4, a distance between the measuring unit 37 and the separating device 36 is at least as great as a diameter of the vessel portion 17 to be packed. If the cut-off packing sheet 10 lies within the permissible tolerance, the packing sheet 10 is cut off by the separating device 36 to the prescribed length and is passed on to the conveyor belt 22 via the intermediate conveyor belt 21 and the diverter 23. Rollers provided upstream and downstream of the conveyor belt 22 are mounted in an articulated manner, so that the packing sheet 10 can be led in and out horizontally. After overcoming the difference in height between the production device 18 and the vessel portion 17, the packing sheet 10 is set upright in the packing-sheet erecting unit 27. After the packing-sheet erecting unit 27, the packing sheet 10 is in a vertically upright position and enters the articulated roller conveyor belt 26. The roller conveyor belt 26 also comprises a lifting unit 38, which is formed for example as a scissors-type lifting table.

Figure 7:
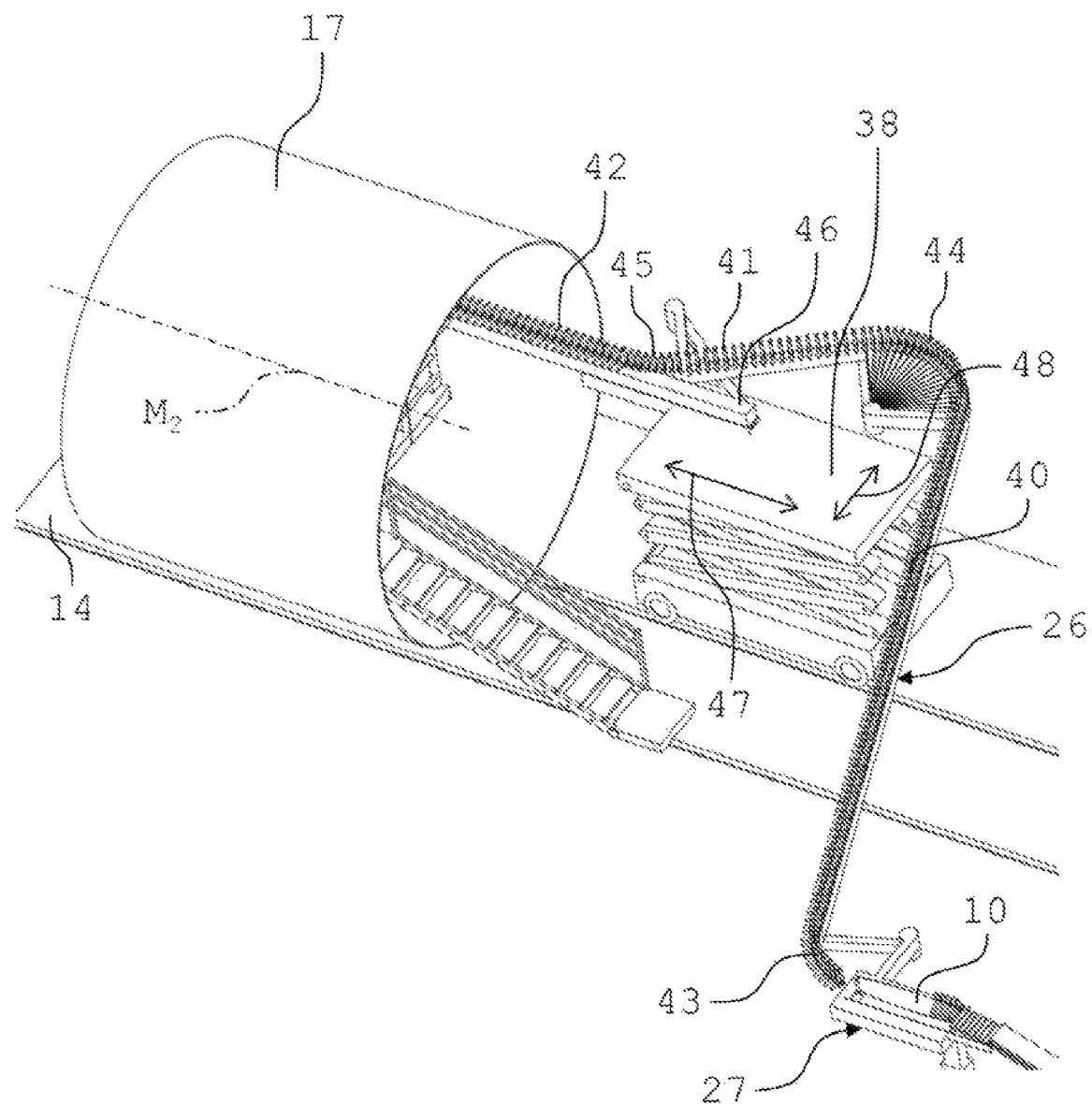
FIG. 7 shows a further schematic perspective partial view of the apparatus according to FIG. 3.

The apparatus 13 also comprises a measuring device 39, which is arranged in the vessel portion 17 and is further explained later. As shown in FIG. 7, the packing sheet 10 is guided in the roller conveyor belt 26 by a number of straight rows of roller blocks 40 to 42 and a number of arcuate rows of roller blocks 43 to 45. Here, the packing sheet 10 is fed to the packing plate 4 under construction. The rows of roller blocks 40 to 45 have in each case a multiplicity of the roller blocks 28 already explained above. The arcuate rows of roller blocks 43 to 45 are connected to joints, so that the last straight row of roller blocks 42 can be displaced laterally and forward and back in a plane. For this purpose, a carrier 46 of the last straight row of roller blocks 42 is displaceable on the lifting unit 38 in the direction of the central axis $M_2$ and perpendicularly to the central axis $M_2$ on the lifting unit 38. The displaceability of the carrier 46 is represented in FIG. 7 by two double-headed arrows 47, 48. Carriers of the roller blocks 28 in the arcuate rows of roller blocks 43 to 45 may be supported against one another by springs, so that there is always the same angle between the individual roller blocks 28.

Figure 8:
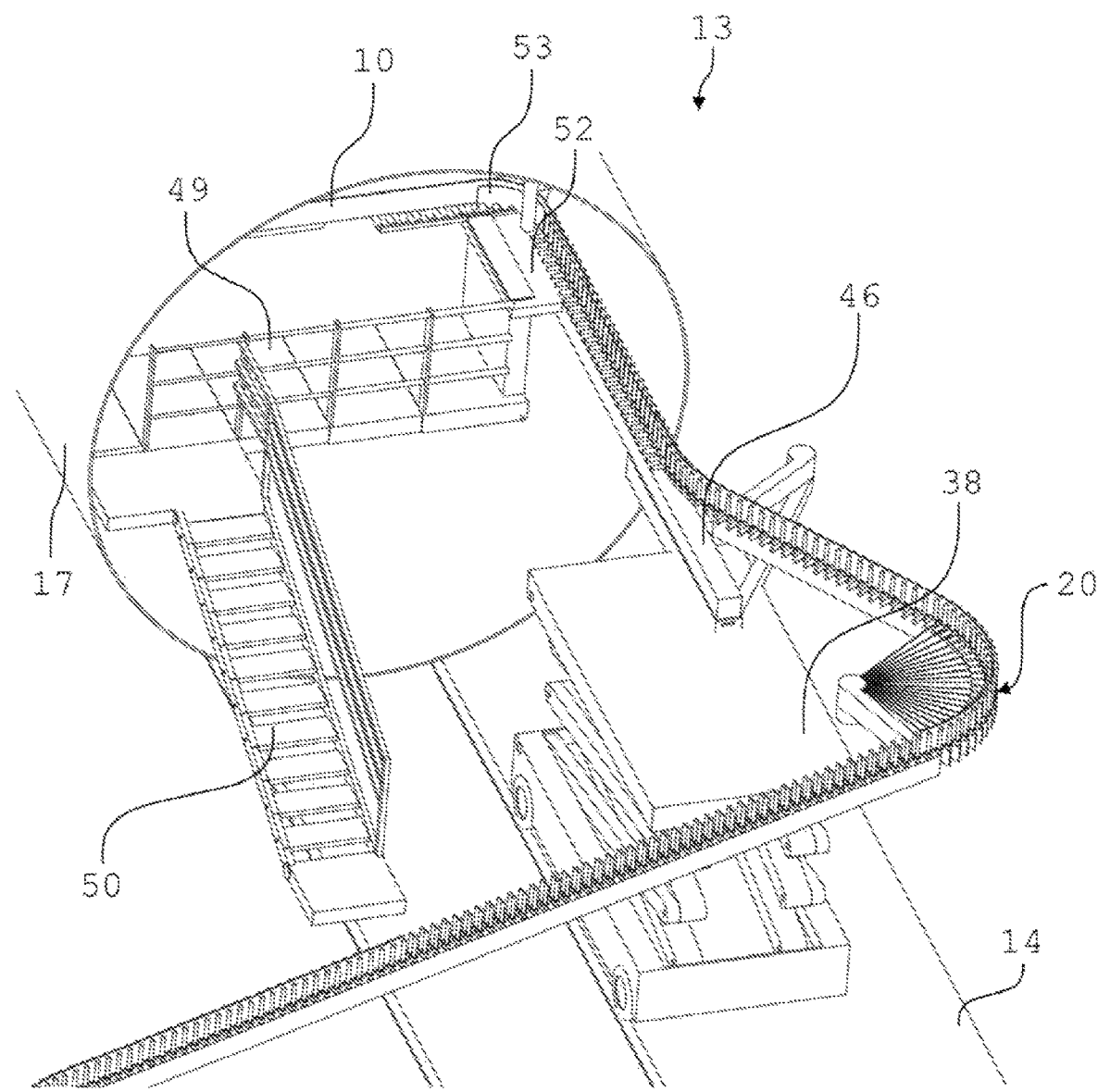
FIG. 8 shows a further schematic perspective partial view of the apparatus according to FIG. 3.
Figure 9:
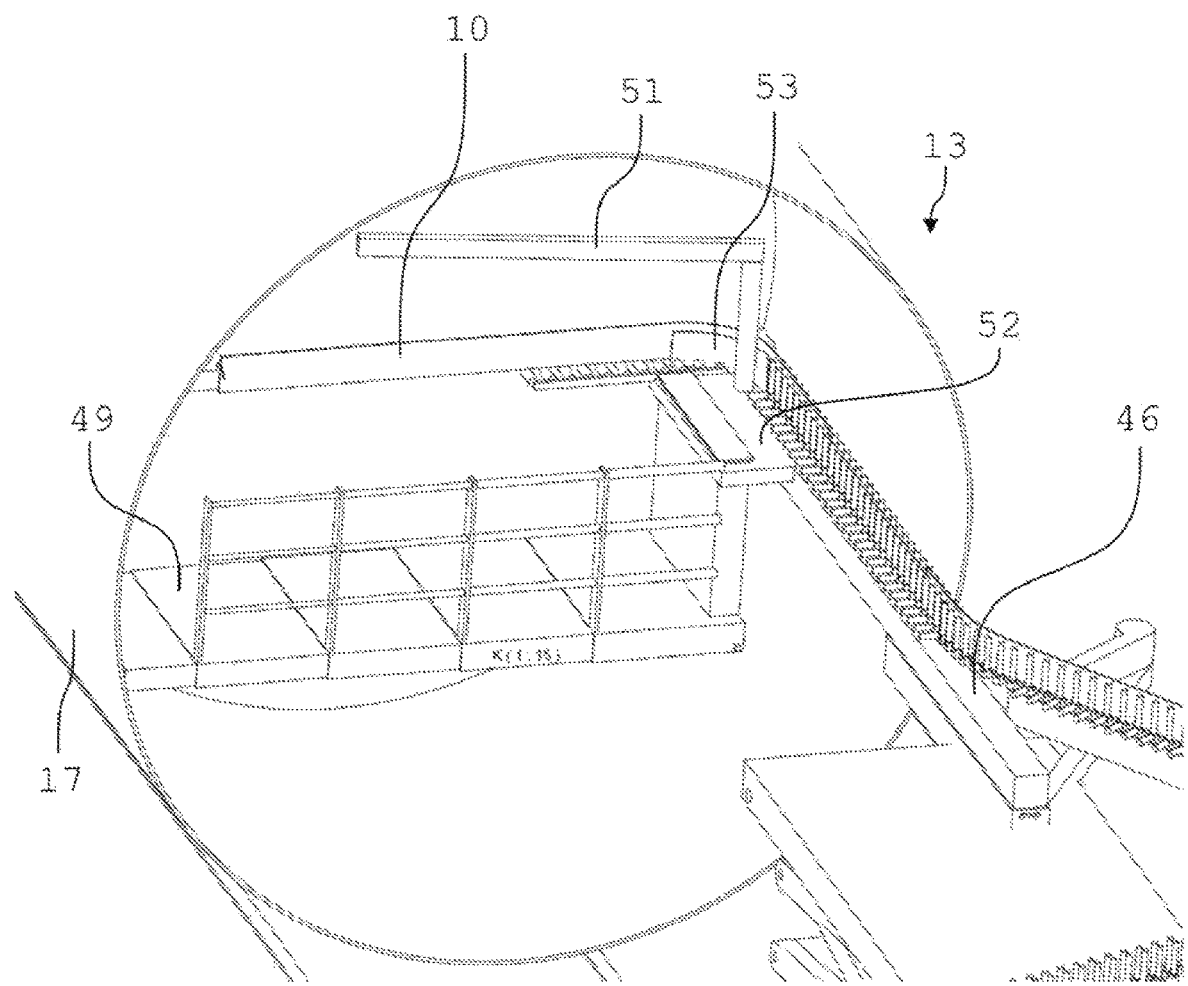
FIG. 9 shows a further schematic perspective partial view of the apparatus according to FIG. 3.
Figure 10:
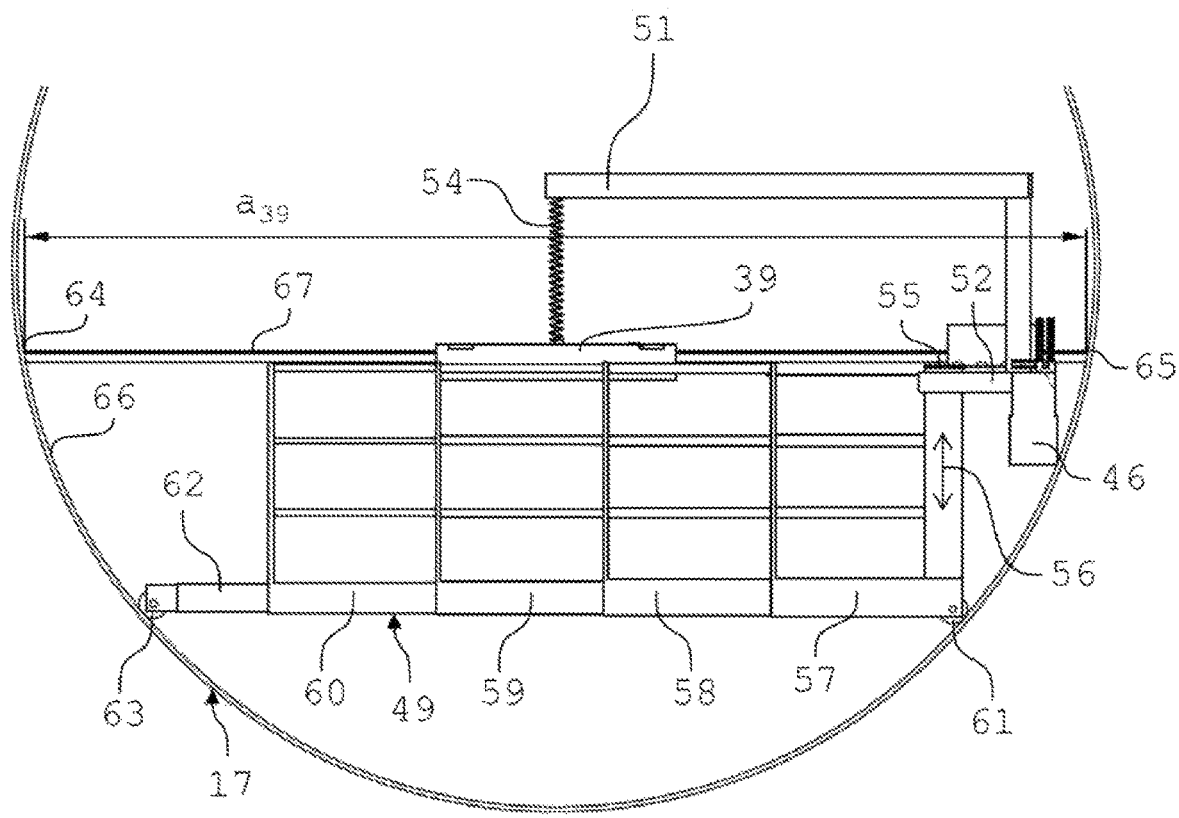
FIG. 10 shows a schematic front view of the apparatus according to FIG. 3.
Figure 11:
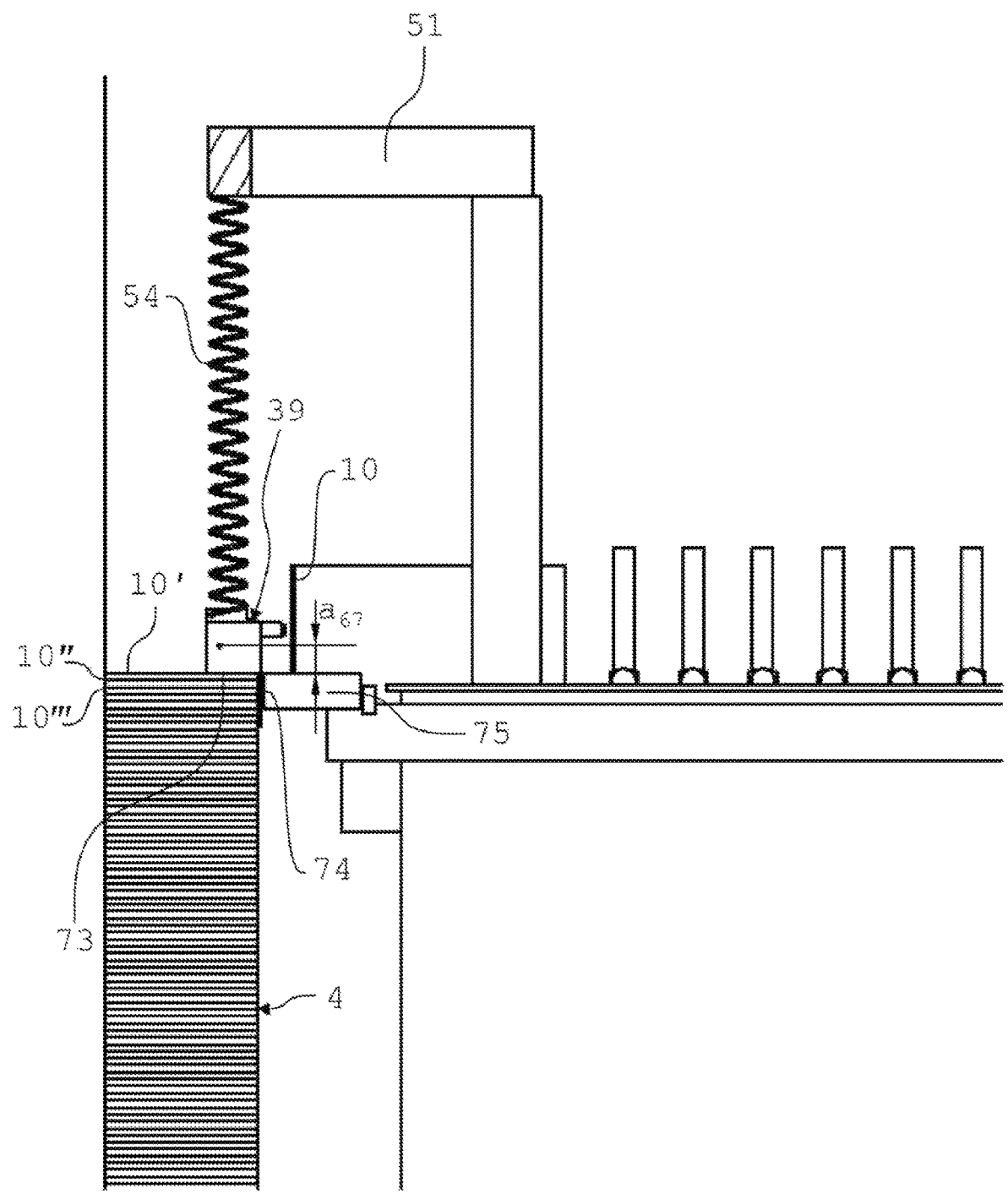
FIG. 11 shows a schematic side view of one embodiment of a measuring device for the apparatus according to FIG. 3.

As shown in FIGS. 8 to 10, the apparatus 13 also comprises a working platform 49, which can be arranged in the vessel portion 17, and a stairway 50, which is fastened on the working platform 49. The working platform 49 may be mounted on the carrier 46. Also provided on the working platform 49 is an adjustable gallows 51, on which the measuring device 39 is suspended. The working platform 49 is fastened on the carrier 46 with the aid of a base plate 52. Also provided on the base plate 52 is the adjustable gallows 51. Also provided on the base plate 52 is a deflecting baffle 53 for deflecting the packing sheet 10. As shown in FIGS. 10 and 11, the measuring device 39 is fastened on the gallows 51 with the aid of a spring element 54. Provided on the carrier 46 is a sliding guide, which is provided with an end stop 55 on the base plate 52. With the aid of the sliding guide, the working platform 49 is guided on the carrier 46 displaceably in the vertical direction up to the end stop 55. The vertical displaceability of the working platform 49 is represented in FIG. 10 with the aid of a double-headed arrow 56.

The working platform 49 comprises a fixed platform portion 57, which is guided on the base plate 52, and a number of further platform portions 58 to 60. The platform portions 57 to 60 are telescopic. Provided on the first platform portion 57 is a roller 61, which is designed to roll on the inside of the vessel portion 17. The working platform 49 also comprises an entry portion 62, on which the stairway 50 may be fastened. The entry portion 62 likewise comprises a roller 63, which can roll on the inside of the vessel portion 17.

The measuring device 39 is designed to measure a distance $a_{39}$ between a first point 64 and a second point 65 of an internal contour 66 of the vessel portion 17. The internal contour 66 of the vessel portion 17 may be a circle. The distance $a_{39}$ between the first point 64 and the second point 65 may be a chord of the circular internal contour 66. The internal contour 66 may also be oval.

Figure 12:
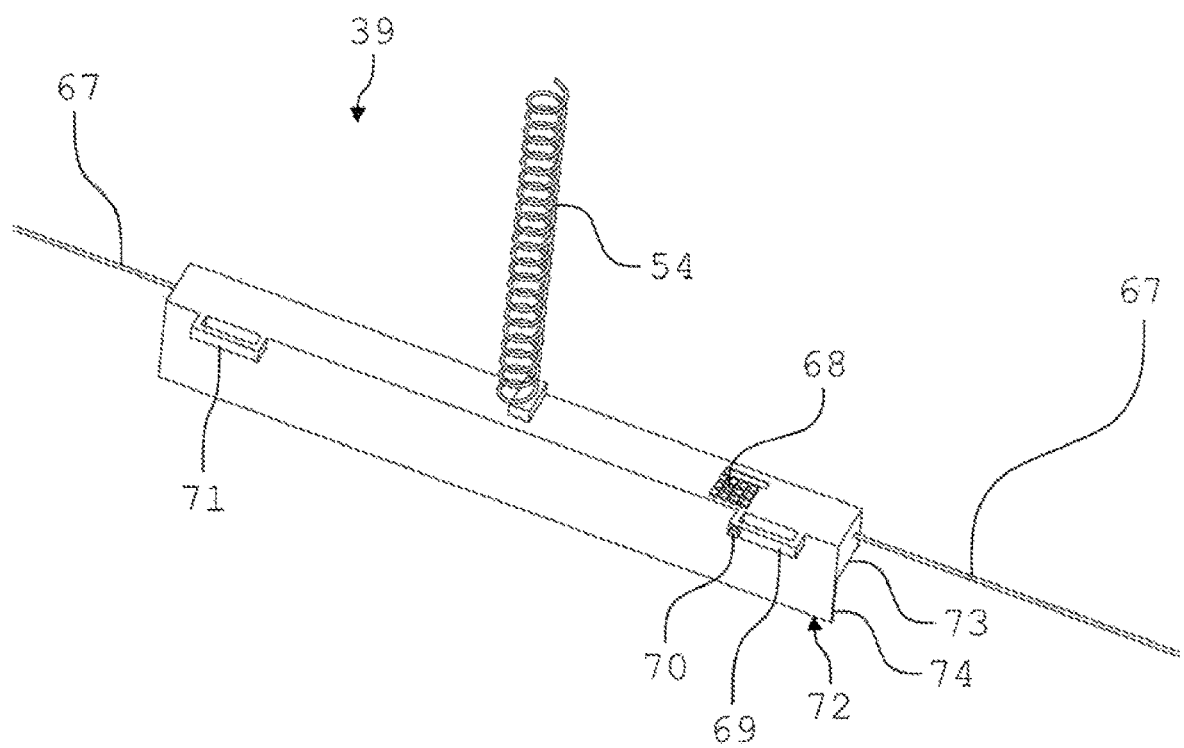
FIG. 12 shows a schematic perspective view of the measuring device according to FIG. 11.
Figure 13:
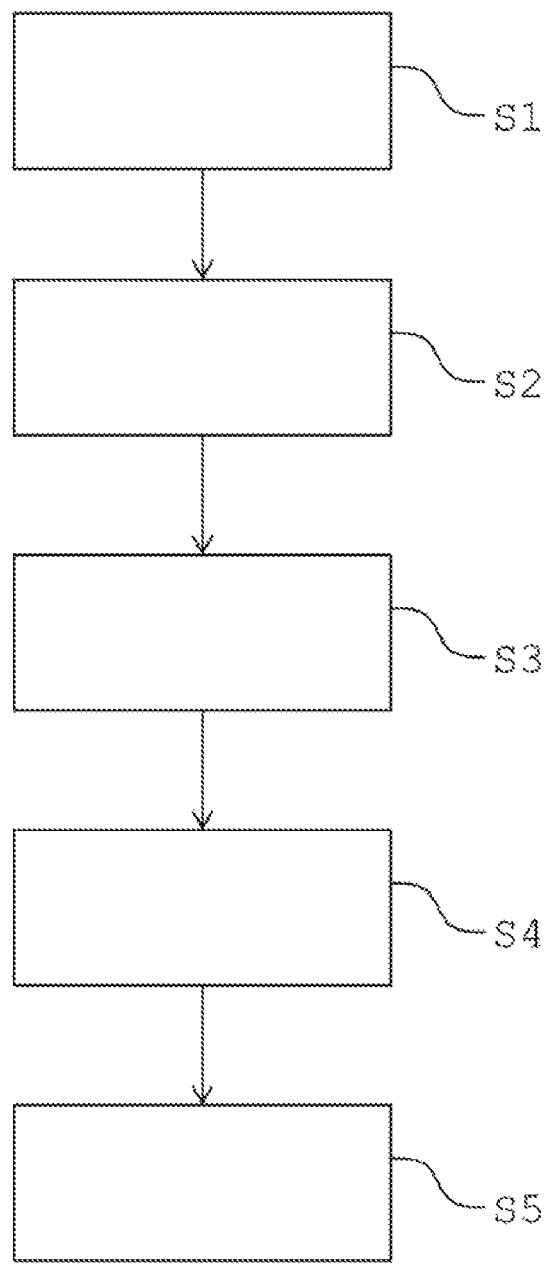
FIG. 13 shows a schematic block diagram of one embodiment of a method for installing a packing plate into a vessel for the mass transfer column according to FIG. 1.

The measuring device 39 may have a laser measuring unit, which is designed to measure the distance $a_{39}$ with the aid of a laser beam 67. As shown in FIG. 12, the measuring device 39 has an operator control panel 68 for operating the measuring device 39. For example, the operator control panel 68 can be used for manually setting the length of a packing sheet 10. As shown in FIG. 12, the laser beam 67 is also activatable and deactivatable by means of an actuating button 70 provided on a handle 69. The measuring device 39 may also have a further handle 71. The measuring device 39 also comprises an aligning angle 72 with a first surface 73 and a second surface 74, arranged perpendicularly to the first surface 73. As shown in FIG. 11, provided on the working platform 49 are still further, non-driven rollers 75, on which the packing sheet 10 is guided.

As shown in FIG. 11, the packing plate 4 is formed by a multiplicity of packing sheets 10', 10", 10''' stacked one on top of the other, only three packing sheets 10', 10", 10''' being provided with a reference sign in FIG. 11. For forming the packing plate 4 in the vessel portion 17, a cut-to-size packing sheet 10 is fed to the working platform 49 with the aid of the feeding device 20. The still upright packing sheet 10 is led manually around the deflecting baffle 53 onto the non-driven rollers 75, so that the packing sheet 10 ends up in front of the already fitted packing sheets 10', 10", 10'''. The fed packing sheet 10 is then tipped over, either forward or backward, onto the already fitted packing sheet 10' and aligned with the aid of the aligning angle 72. By being pressed by the surfaces 73, 74 of the aligning angle 72, the uppermost packing sheet 10 is pressed against the already present packing sheets 10', 10", 10''' and at the same time leveled. As this is taking place, the fitter holds the measuring device 39 by the handles 69, 71.

After setting up the packing sheet 10, the fitter presses the actuating button 70 and the distance $a_{39}$ is determined with the aid of the measuring device 39. Since the laser beam 67 is arranged at a distance $a_{67}$ away from the uppermost packing sheet 10', the length of a packing sheet 10 that is required after a set number of layers, for example after three or four layers of packing sheets 10, is determined with the aid of the measuring device 39. The distance $a_{39}$ determined by the measuring device 39 is transmitted to the separating device 36, in particular to a controller that is not represented of the separating device 36, by a data transmission device that is likewise not represented in the figures. The distance $a_{67}$ of the laser beam 67 above the last packing layer divided by the thickness of the packing sheets 10 gives the number of packing sheets 10 that still have to be fitted before the packing sheet 10 that is measured. In this way, allowance can be made for packing sheets 10 that are already underway in the conveying device 20.

After the measuring operation, the fitter lets go of the aligning angle 72, and the spring element 54 on the movable gallows 51 pulls the measuring device 39 up and away, so that a new packing sheet 10 can be fitted. With every new packing sheet 10, the roller conveyor belt 26 is raised by the thickness of a packing sheet 10 with the aid of the lifting unit 38. Furthermore, the horizontal position of the carrier 46 can also be adapted.

The fact that the working platform 49 is vertically guided means that it can be raised together with the measuring device 39. For the lowermost layer of packing sheets in the vessel portion 17, the carrier 46 of the straight row of roller blocks 42 is moved slightly toward the middle and downward. The working platform 49 thereby collapses. The collapsing may take place manually, by spring loading or by electrical, pneumatic or hydraulic drives. In the upper region of the vessel portion, the roller 61 of the first platform portion 57 no longer lies against the vessel portion 17, but instead is held by the carrier 46 via the end stop 55.

In the case of a method for installing a packing plate 4 to 8 of the packing 3 into the vessel 2, in a step S1 the endless packing strip 19 is provided. For this purpose, the endless packing strip 19 may be produced from an aluminum coil with the aid of the production device 18. In the production device 18, the aluminum coil may for example be provided with perforations or corrugations. In a step S2, the distance $a_{39}$, which is preferably horizontal, between two points 64, 65 lying opposite one another of the internal contour 66 of the vessel 2 or of the vessel portion 17 is determined. On the basis of the distance $a_{39}$ determined, in a step S3 the endless packing strip 19 will be separated into individual packing sheets 10, 10', 10", 10"', wherein a length of a respective individual packing sheet 10, 10', 10", 10"' corresponds to the determined, preferably horizontal, distance $a_{39}$ or is less than the distance $a_{39}$. The individual packing sheets 10, 10', 10", 10"' are fed to the vessel portion 17 one after the other. This takes place in a step S4. In a step S5, the individual packing sheets 10 are placed, generally stacked, in the vessel portion 17 to form the packing plate 4. In this way, a number of packing plates 4 to 8 can be constructed one after the other in the vessel portion 17, wherein the vessel portion 17 is turned further by a defined angle after completing the fitting of each packing plate 4 to 8.

Although the present invention has been described completely using exemplary embodiments, it can be modified in various ways.

The invention claimed is:

1. An apparatus for installing a packing plate of a structured packing into a vessel of a mass transfer column (1), wherein a central axis of the vessel is arranged horizontally, said apparatus comprising:
   a separating device for separating an endless packing strip into individual packing sheets,
   a feeding device for feeding the individual packing sheets into the vessel, in order to stack the individual packing sheets in the vessel to form the packing plate, and
   a measuring device designed to measure a distance between two points opposite one another of an internal contour of the vessel,
   wherein the separating device is designed to detach the individual packing sheets from the endless packing strip in such a way that a respective length of the packing sheets is less than or equal to the distance measured by the measuring device.

2. The apparatus as claimed in claim 1, further comprising a production device for producing the endless packing strip.

3. The apparatus as claimed in claim 1, wherein the feeding device has an articulated roller conveyor belt and a lifting unit, wherein the lifting unit is designed to raise and lower the articulated roller conveyor belt.

4. The apparatus as claimed in claim 3, wherein the roller conveyor belt has a packing-sheet erecting unit for bringing the individual packing sheets from a horizontal arrangement into a vertical arrangement.

5. The apparatus as claimed in claim 4, wherein the feeding device has a height-adjustable conveyor belt and the packing-sheet erecting unit is positioned between the articulated roller conveyor belt and the height-adjustable conveyor belt.

6. The apparatus as claimed in claim 1, wherein the separating device has a measuring unit for measuring the individual packing sheets.

7. The apparatus as claimed in claim 1, further comprising a height-adjustable working platform arranged in the vessel.

8. The apparatus as claimed in claim 7, wherein the height-adjustable working platform has telescopic platform portions.

9. The apparatus as claimed in claim 1, further comprising an aligning angle for aligning the individual packing sheets in relation to one another in the vessel.

10. The apparatus as claimed in claim 9, wherein the measuring device is provided on the aligning angle.

11. The apparatus as claimed in claim 1, wherein the feeding device has a height-adjustable conveyor belt.

12. The apparatus according to claim 1, wherein the distance measured by the measuring device is a horizontal distance.

13. A method for installing a packing plate of a structured packing into a vessel of a mass transfer column, wherein a central axis of the vessel is arranged horizontally, said method comprising:
   (a) providing (S1) an endless packing strip;
   (b) determining a distance between two points opposite one another of an internal contour of the vessel;
   (c) detaching (S3) individual packing sheets from the endless packing strip, wherein the individual packing sheets are detached from the endless packing strip in such a way that a length of a respective packing sheet corresponds to the distance or is less than the distance;
   (d) feeding the individual packing sheets to the vessel; and
   (e) placing the individual packing sheets into the vessel;
   wherein (a) to (e) are carried out repeatedly to form the packing plate.

14. The method as claimed in claim 13, wherein the packing sheets are placed next to one another or one on top of the other in a stack.

15. The method as claimed in claim 13, wherein the distance is determined separately for each packing sheet.

16. The method as claimed in claim 13, wherein a number of packing sheets are fed to the vessel at the same time.

17. The method as claimed in claim 13, wherein the distance is measured at a predetermined distance away from a packing sheet that has already been placed in the vessel.

18. The method as claimed in claim 13, wherein, after the installation of one packing plate and before the installation of a further packing plate, the vessel is rotated about the central axis.

19. The method as claimed in claim 13, wherein said distance is a horizontal distance.

20. The method as claimed in claim 13, wherein the distance is measured a predetermined distance away from a packing sheet that has already been placed in the vessel with one side exposed.

* * * * *